United States Patent [19]
Nishiyama et al.

[11] 4,296,843
[45] Oct. 27, 1981

[54] DISC BRAKE FOR TWO-WHEELED VEHICLE

[75] Inventors: Yukinori Nishiyama; Hideji Ichikawa, both of Itami, Japan

[73] Assignee: Sumitomo Electric Industries, Ltd., Osaka, Japan

[21] Appl. No.: 113,422

[22] Filed: Jan. 18, 1980

[30] Foreign Application Priority Data

Jan. 19, 1979 [JP] Japan .............................. 54-7036[U]

[51] Int. Cl.³ .......................................... F16D 55/224
[52] U.S. Cl. .................................. 188/73.43; 188/26; 188/73.46
[58] Field of Search ...................... 188/18 A, 71.1, 26, 188/73.3, 344

[56] References Cited

U.S. PATENT DOCUMENTS

| | | | |
|---|---|---|---|
| 4,022,297 | 5/1977 | Haraikawa | 188/73.3 |
| 4,084,666 | 4/1978 | Karasudani | 188/73.3 |
| 4,222,464 | 9/1980 | Moriya | 188/73.3 |

*Primary Examiner*—Robert R. Song
*Attorney, Agent, or Firm*—Sughrue, Mion, Zinn, Macpeak & Seas

[57] ABSTRACT

A floating type disc brake assembly for a two-wheeled vehicle having two pad assemblies one of which is operatively coupled to a caliper and the other to an opposing caliper arm. The caliper assembly is coupled to a fork of the vehicle through a pin disposed in a through-hole in a stationary member of the fork. Recesses are provided in either the stationary member or the pin within the area of the through-hole with elastic members disposed in the recesses to partially fill a portion of the gap left between the stationary member and the pin. Upon application of a sufficiently high torque such as for backward movement of the vehicle, the pin is brought into abutment with the stationary member thereby halting compression of the elastic members and thereby preventing their cracking due to excessive forces.

2 Claims, 7 Drawing Figures

DISC BRAKE FOR TWO-WHEELED VEHICLE

BACKGROUND OF THE INVENTION

The present invention relates to disc brakes and more particularly to a floating type disc brake for use with a two-wheeled vehicle such as a bicycle or motorcycle.

A caliper floating type disc brake as shown in FIGS. 1 through 3 is well known as a disc brake of simple construction which can be readily mounted on the fork of a two-wheeled vehicle. This brake is advantageous in that it is unnecessary to use mounting parts such as a bracket and its securing bolts and the brake is simple in construction. However, this brake is still disadvantageous in that it is so designed that a pin running through the stationary member receives the brake torque which results when the vehicle is moved backward. Because of this, the rubber bushing on the pin has a tendency to crack.

This will be described in more detail. In FIGS. 1 through 3, reference character A designates a disc; 11 and 12, pad assemblies; and 13, a caliper cylinder. In this conventional disc brake, protrusions 3 and 4 are provided in the front and rear regions of the side 2 of the caliper 1 on either side of a stationary member 6 which is integral with the fork 5 of the vehicle or which is mounted on the fork 5. The stationary member 6 has a through-hole 7. The caliper 1 is mounted on the fork 5 by inserting a pin 8 into the through-hole 7 and the two protrusions 3 and 4. It should be noted that an elastic bushing 9 made of, for instance, rubber is disposed in the through-hole 7. The elastic bushing 9 serves to absorb and eliminate variations in dimension of the side 2 of the caliper, the flat surface 10 of the stationary member 6, and the through-hole 7.

In the disc brake described above, when the vehicle moves forward, the brake torque is received by the flat surface 10 of the stationary member 6 abutting against the side 2 of the caliper 1 as the disc A turns in the direction of the arrow in FIG. 1. When the vehicle moves backward, the brake torque is received by the pin 8 running through the stationary member 6.

When the brake torque resulting from backward movement is received by the pin 8, the bushing 9 disposed in the through-hole 7 and surrounding the pin 8 is compressed and deformed. If the compression force is great, the bushing 9 may crack.

Accordingly, an object of the present invention is to provide a disc brake for a two-wheeled vehicle in which the bushing disposed in the through-hole for absorbing the dimensional variations is so designed that it will not crack even if it is subjected to high compression and accordingly to great deformation.

SUMMARY OF THE INVENTION

These, as well as other objects of the invention are met by a floating type disc brake assembly for a two-wheeled vehicle such as a motorcycle or bicycle including two pad assemblies, a caliper including a caliper cylinder and a caliper arm, one of the two pad assemblies being operatively coupled to the caliper cylinder while the other is supported by the caliper arm, and a pin for securing the caliper to a stationary member of a fork of the vehicle with the pin disposed in a through-hole in the stationary member. Recesses are provided in one of the stationary members and the pin within the area of the through-hole. Elastic members are disposed in the recesses to at least partially fill the gap left between the stationary member and the pin wherein upon application of a sufficiently high torque force the pin is brought into operative abutment with the stationary members so as to stop compression of the elastic members. As used herein, "operative abutment" is intended to mean that either the pin is directly in abutment with the stationary member or the pin is in direct abutment with a third rigid member which itself is in abutment with the stationary member so that no further movement is permitted in the direction of the force.

The recesses in which the elastic members are disposed are, in one preferred embodiment, provided in the stationary member at both ends of the through-holes. In another preferred embodiment, there is further provided a collar member positioned around the pin with the recesses in which the elastic members are disposed being provided in an outer wall of the collar. In this case, the recesses extend along the longitudinal axis of the collar and are preferably spaced at equal intervals from one another.

DESCRIPTION OF THE PREFERRED EMBODIMENTS

Figure 1:
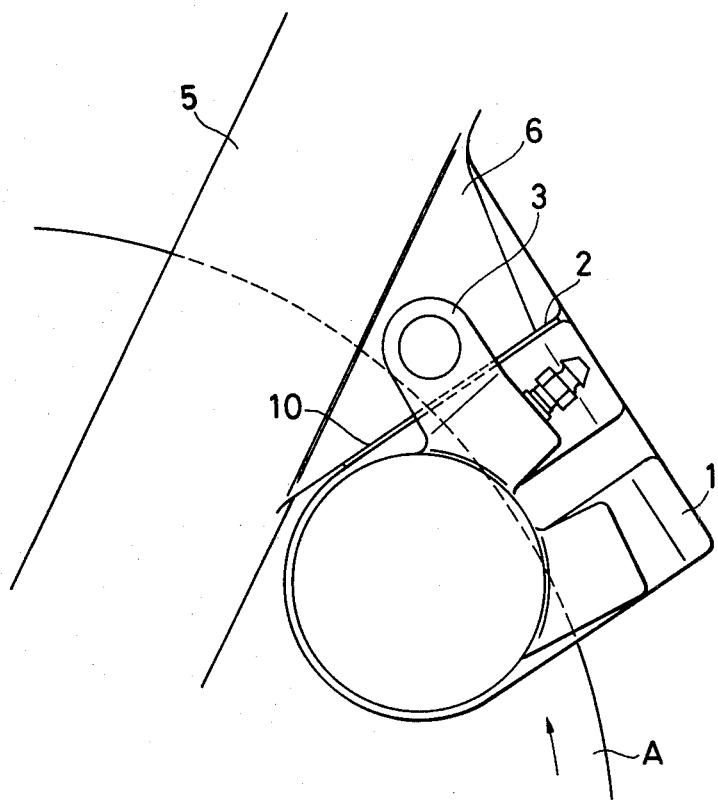
FIG. 1 is a front view of a conventional disc brake.
Figure 2:
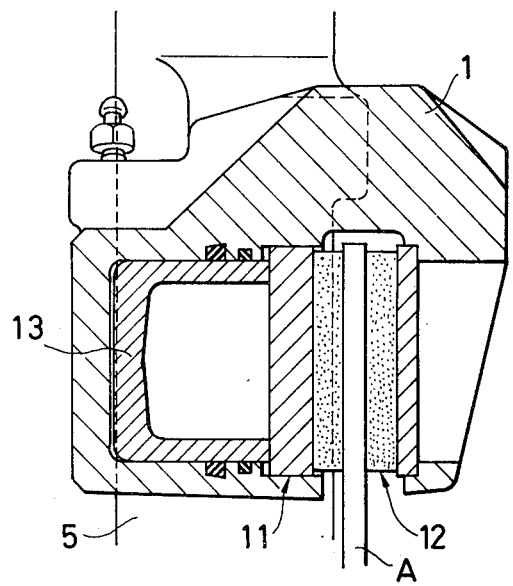
FIG. 2 is a sectional view of the disc brake shown in FIG. 1.
Figure 3:
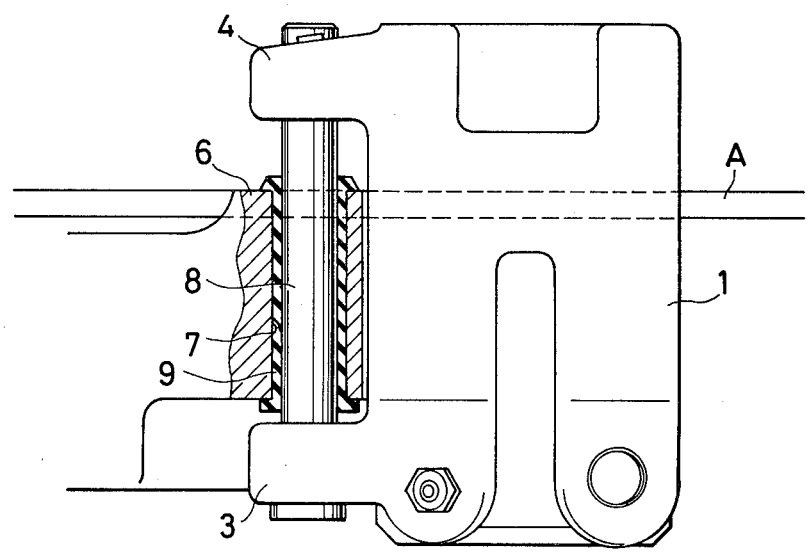
FIG. 3 is a plan view, with parts cut away, of the disc brake shown in FIGS. 1 and 2.
Figure 4:
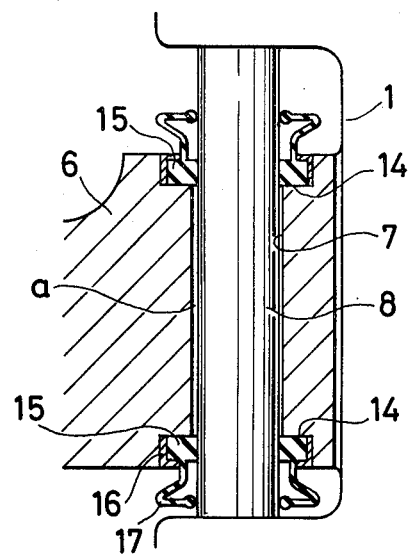
FIG. 4 is a sectional view, with parts cut away, showing a first example of a disc brake according to the invention.

A first example of a disc brake according to the invention as shown in FIG. 4 includes a caliper 1, a stationary member 6 having a through-hole 7, and a pin 8 positioned in the through-hole 7. Recesses 14 are formed at both ends of the through-hole 7. Ring-shaped elastic members 15 are inserted in each of the recesses 14. A dust sealing boot 17 is provided integrally with the elastic member 15. Securing rings 16 prevent the elastic members 15 from being dislodged from the recesses. A small gap a is left between the through-hole 7 and the pin 8. The elastic members 15 partially cover the gap a. In the remaining part of the gap a which is not covered by the elastic members 15, the pin 8 directly confronts the inner wall of the stationary member 6 in the through-hole 7.

In the disc brake constructed as described above, upon application of brake torque when the vehicle moves backward, the pin 8 first compresses the elastic members 15 through the distance of the gap a until it abuts against the stationary member 6 directly whereupon the stationary member 6 receives the brake torque. When the pin 8 abuts against the stationary member 6, compression of the elastic members 15 is stopped because the movement of pin 8 is halted by the stationary member 6. Accordingly, even if the brake torque is great, the elastic members 15 will not crack.

Figure 5:
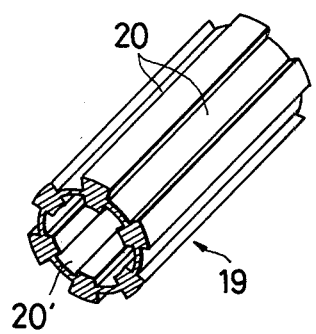
FIG. 5 is a perspective view showing a collar employed in a second example of the disc brake according to the invention.
Figure 6:
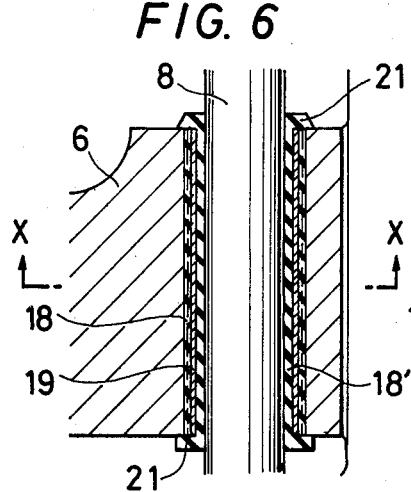
FIG. 6 is a sectional view, with parts cut away, of the disc brake in FIG. 4.
Figure 7:
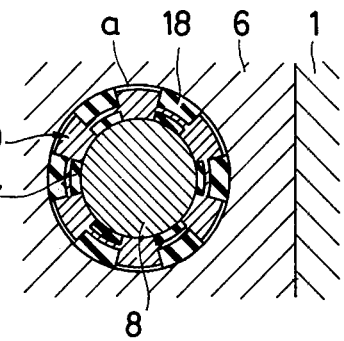
FIG. 7 is a sectional view taken along line X—X in FIG. 6.

FIGS. 5 through 7 illustrate a second example of the disc brake according to the invention. In this example, elastic members 18 are disposed in grooves 20 formed in the outer wall of a rigid collar 19. The grooves 20 are provided in such a manner that they extend along the axis of the collar 9 and are spaced at equal intervals.

As is best seen in FIG. 7, the elastic members 18 disposed in the grooves 20 protrude slightly from the outer circumferential surface of the collar 19 to fill parts of the gap a between the collar 19 and the inner wall of the through-hole 7. In the remaining parts of the gap a which are not filled with the elastic members 18, the collar 19 directly confronts the inner wall of the stationary member 6 in the through-hole.

The pin 8 is inserted through the collar 19. In this case, it is preferable that grooves 20' similar to the grooves 20 are formed in the inner wall of the collar 19 and that elastic members 18' are disposed in the grooves 20' thus formed so that there is some degree of freedom for inserting the pin 8 into the collar 19.

As shown in FIG. 6, dust sealing flanges 21 integral with the elastic members 18 and 18' are provided on both ends of the collar 19. The elastic members 18 and 18' and dust sealing flanges can be produced by molding elastic material such as rubber around the collar 19.

In the disc brake constructed as shown in FIGS. 5 through 9, upon application of brake torque when the vehicle moves backward, the pin 8 compresses the elastic members 18 through the distance of the gap a through the collar until it abuts indirectly against the stationary member 6 whereupon the stationary member 6 receives the brake torque. When the collar 19 is in abutment with the stationary member 6, the elastic members 18 are compressed no further. Accordingly, as in the first example described above, the elastic members 18 will not crack even if a large braking torque is applied.

As is apparent from the above description, in the disc brake for a two-wheeled vehicle according to the invention, recesses are formed either in the stationary member side or in the pin side and elastic members are disposed in the recesses to partially fill the gap between the stationary member and the pin. Therefore, a load applied to the elastic member such as a rubber bushing is greatly relieved when compared with that of a conventional disc brake and, accordingly, the drawback in a conventional disc brake that the elastic member tends to crack is positively eliminated with the invention.

What is claimed is:

1. A floating type disc brake for a two-wheeled vehicle comprising: two pad assemblies, a caliper including a caliper cylinder and a caliper arm, one of said pad assemblies being operatively coupled to said caliper cylinder and the other of said pad assemblies being supported by said caliper arm, a pin for securing said caliper to a stationary member of a fork member of said vehicle, said pin being disposed in a through-hole in said stationary member, recesses being provided in one of said stationary member and said pin within said through-hole, elastic members disposed in said recesses to at least partially fill a portion of a gap between said stationary member and said pin wherein upon application of a sufficiently high force said pin is brought into operative abutment with said stationary member so as to stop compression of said elastic members, and a collar member positioned around said pin, said recesses in which said elastic members are disposed being provided in an outer wall of said collar.

2. A disc brake as claimed in claim 1 wherein said recesses provided in the outer wall of said collar extend along the longitudinal axis of said collar and are arranged at equal intervals.

* * * * *